J. W. EGGLESTON.
DETACHABLE HANDLE FOR SCREW DRIVERS.
APPLICATION FILED JUNE 22, 1912.
1,096,529.  Patented May 12, 1914.
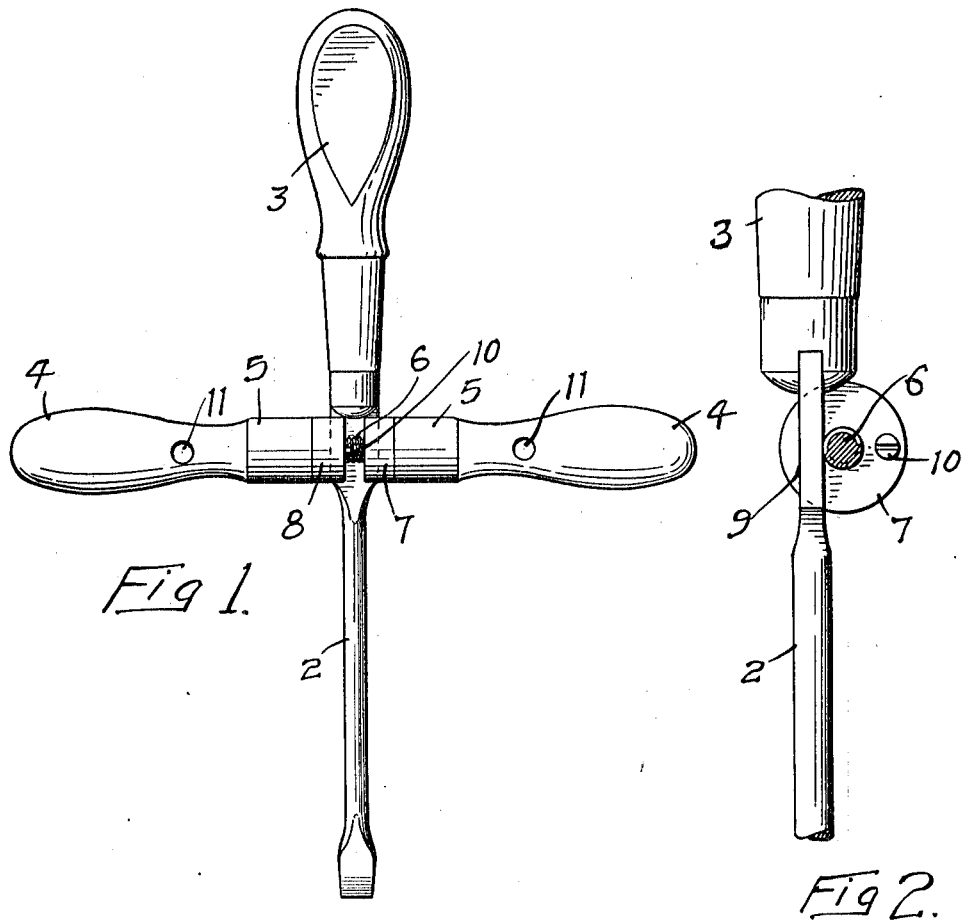
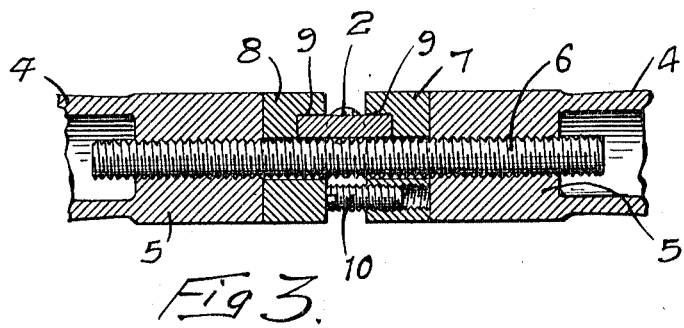
WITNESSES
A. M. Walstrom
G. E. Sorensen
INVENTOR
JAMES W. EGGLESTON
BY Paul & Paul
ATTORNEYS

UNITED STATES PATENT OFFICE.

JAMES W. EGGLESTON, OF MINNEAPOLIS, MINNESOTA.

DETACHABLE HANDLE FOR SCREW-DRIVERS.

1,096,529.  Specification of Letters Patent.  Patented May 12, 1914.

Application filed June 22, 1912. Serial No. 705,225.

*To all whom it may concern:*

Be it known that I, JAMES W. EGGLESTON, of Minneapolis, Hennepin county, Minnesota, have invented certain new and useful Improvements in Detachable Handles for Screw-Drivers, of which the following is a specification.

The object of my invention is to provide a detachable handle capable of being mounted at right angles substantially to the screw driver shank for the purpose of aiding the person using the screw driver in securing large screws into the wood, or small screws into wood of very close grain where it is extremely difficult to operate an ordinary screw driver having a handle in line with the shank.

My invention consists generally in various constructions and combination, all as hereinafter described and particularly pointed out in the claims.

In the accompanying drawing forming part of this specification, Figure 1 is a side view of a screw driver with my detachable handle mounted thereon, Fig. 2 is a transverse sectional view of the same, Fig. 3 is a detail sectional view illustrating the manner of clamping the handle on the shank of the screw driver.

In the drawing, 2 represents the screw driver shank of ordinary construction and 3 the usual handle therefor. 4 represents hand grips of metal or suitable material having hubs 5 formed thereon in which the ends of a screw 6 are tapped, the screw being of sufficient length to allow adjustment of the hand grips back and forth thereon until the desired position with respect to the shank of the screw driver is obtained. 7 and 8 represent jaws loosely mounted on the screw 6 between the hubs 5 and having transverse slots 9 therein to receive the flattened portion of the shank 2. When the shank has been inserted in the slots the hand grips 4 are turned, moving the jaws toward one another until they firmly grip the edges of the shank. I prefer also to provide an adjusting screw 10 in one of the jaws that is adapted to contact with the face of the other jaw to hold the faces of the jaws in parallel relation with one another when they engage the shank, thereby preventing any side or lateral strain on the jaws. I may also provide holes 11 in the hand grips into which a wire, nail, or any suitable device may be inserted for tightening the jaws of the shank or loosening them.

I have shown the device used in connection with a screw driver, but it may be applied to the shanks of various other tools and the range of adjustment of the jaws allows the device to be clamped on shanks of varying shapes and sizes and with or without handles.

I claim as my invention:

1. A detachable handle for screw drivers comprising hand grips, a screw tapped therein, jaws loosely mounted on said screw, said jaws having seats to receive the shank of a screw driver at one side of the center of said jaws, and an adjusting screw on the opposite side of the center of said jaws and operating to hold them in parallel relation with one another during the clamping operation.

2. A temporary handle for tools comprising spaced hand-grips, a screw having its ends axially engaged in said hand-grips, and opposed jaws loosely mounted on said screw and bearing against the inner ends of said hand-grips, said jaws being respectively formed at one side of the screw with opposed recesses for conjointly receiving the shank of a tool.

In witness whereof, I have hereunto set my hand this 24" day of May, 1912.

JAMES W. EGGLESTON.

Witnesses:
GENEVIEVE E. SORENSEN,
EDWARD A. PAUL.

Copies of this patent may be obtained for five cents each, by addressing the "Commissioner of Patents, Washington, D. C."